(12) United States Patent
Derclaye

(10) Patent No.: US 11,346,224 B2
(45) Date of Patent: May 31, 2022

(54) HYBRID ROTOR WITH A SEGMENTED DRUM

(71) Applicant: SAFRAN AERO BOOSTERS SA, Herstal (BE)

(72) Inventor: Alain Derclaye, Herstal (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 61 days.

(21) Appl. No.: 16/747,371

(22) Filed: Jan. 20, 2020

(65) Prior Publication Data
US 2020/0248556 A1 Aug. 6, 2020

(30) Foreign Application Priority Data

Feb. 4, 2019 (BE) .................................. 2019/5063

(51) Int. Cl.
*F01D 5/06* (2006.01)
*F01D 25/00* (2006.01)
(52) U.S. Cl.
CPC ........... *F01D 5/066* (2013.01); *F01D 25/005* (2013.01); *F05D 2300/603* (2013.01)
(58) Field of Classification Search
CPC ............... F01D 5/06; F01D 5/066; F01D 5/30
See application file for complete search history.

(56) References Cited

U.S. PATENT DOCUMENTS

| 5,632,600 | A | * | 5/1997 | Hull | ......................... | F01D 5/06 |
| | | | | | | 416/198 A |
| 6,213,720 | B1 | | 4/2001 | Farmer | | |
| 2017/0023023 | A1 | * | 1/2017 | Hiernaux | .............. | F04D 29/321 |
| 2017/0335719 | A1 | * | 11/2017 | Hendrickson | ........... | F16B 31/06 |

FOREIGN PATENT DOCUMENTS

| EP | 2287445 A1 | 2/2011 |
| EP | 2801702 A1 | 11/2014 |
| EP | 2818635 A1 | 12/2014 |
| WO | 2016059348 A1 | 4/2016 |

OTHER PUBLICATIONS

Search Report dated Sep. 19, 2019 for BE 201905063.

* cited by examiner

*Primary Examiner* — David E Sosnowski
*Assistant Examiner* — Maxime M Adjagbe
(74) *Attorney, Agent, or Firm* — James E. Walton

(57) ABSTRACT

A rotor for an axial turbomachine includes a drum formed of several parts including: composite rings made of composite material and metallic rings interposed between the composite rings. The metallic rings carry the rotor blades. The metallic rings have an axial branch axially overlapping the composite rings and at least one radial branch in contact with the composite rings.

6 Claims, 5 Drawing Sheets

HYBRID ROTOR WITH A SEGMENTED DRUM

This application claims priority under 35 U.S.C. § 119 to Belgium Patent Application No. 2019/5063, filed 4 Feb. 2019, titled "Hybrid Rotor with a Segmented Drum," which is incorporated herein by reference for all purposes.

BACKGROUND

1. Field of the Application

The present application relates to the design of a turbomachine, in particular an aircraft turbojet or an aircraft turboprop with a fan driven by a reduction gear. The present application relates in particular to a rotor for a compressor composed of several parts including a drum made of hybrid material.

2. Description of Related Art

Document EP 2818635 A1 describes a compressor rotor for a turbomachine. A drum is arranged there, supporting several annular rows of rotor blades of which at least one blade is integral with the rotor. This hybrid design saves time during production and assembly because all the blades are not integral with the drum. However, such a design can be improved from the point of view of the weight of the rotor. The weight is a harmful aspect for a compressor rotor not only because it requires more energy to be rotated, reducing the efficiency of the engine, but also because it participates in the overall weight of the aircraft and therefore the fuel requirement for the flight of the aircraft.

Document EP 2287445 A1 describes a compressor rotor composed of segments of composite material and metal rings. The latter are provided with dovetail grooves for receiving rotor blades.

Such a design can have heterogeneities in the distribution of the weight axially because the dovetails require massive metal crowns. Also, there is room for improvement in terms of overall dimensions and overall weight of the rotor.

Machining dovetails is also costly and time-consuming.

Although great strides have been made in the area of turbomachines with fans driven by reduction gears, many shortcomings remain.

DETAILED DESCRIPTION OF THE PREFERRED EMBODIMENT

Figure 1:
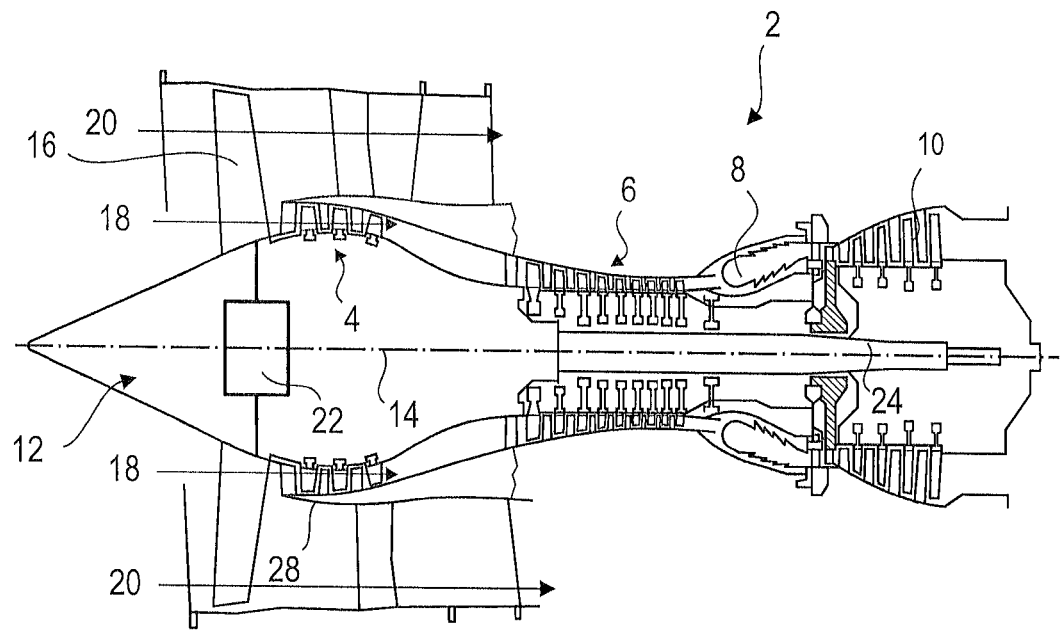
FIG. 1 shows an axial turbomachine.

The present application aims to provide a lighter rotor which is more economical to manufacture and to assemble.

The present application relates to a rotor for a compressor of a turbomachine, such as an aircraft turbojet engine, comprising: composite rings, each composite ring of substantially axisymmetric shape and made of composite material; metallic rings, each of which supporting a respective annular row of rotor blades, each metallic ring being interposed axially between two of the composite rings and having a cross-section with an axial branch that overlaps axially partially said two of the composite rings; wherein the metallic rings are connected in pairs and exclusively by means of one of the composite rings.

A drum is thus formed by the successive arrangement along an axis, of the composite rings and metallic rings, the metallic rings overlapping axially only partially the composite rings.

According to a preferred embodiment, the cross-section is T-shaped and comprises a radial branch, each of said two composite rings having an end extending radially and arranged in abutment on the radial branch of the metallic ring.

According to a preferred embodiment, a screw or a rivet passes through the radial branch of the metallic ring and through the respective ends of each of the two composite rings.

According to a preferred embodiment, the radial branch has an internal radial end which comprises an axial thickened portion projecting upstream and downstream of the radial branch, the thickened portion defining two radially external surfaces for centering the respective end of the two composite rings on the metallic ring.

According to a preferred embodiment, the cross-section is in a shape of the Greek letter π, comprising two radial branches, each of the two composite rings having an end extending radially and arranged in abutment on one of the respective radial branches of the metallic ring.

According to a preferred embodiment, the axial branch has an internal surface for centering the two composite rings. This internal surface may be subdivide into two surfaces arranged on each side of the radial branch, each of these two surfaces cooperating with one of the composite ring.

According to a preferred embodiment, the metallic ring and the rotor blades are integrally formed. Alternatively, the blades can be welded to the metallic ring.

According to a preferred embodiment, the composite rings are of a generally U-shape, open radially inwards or outwards.

According to a preferred embodiment, the composite rings have an external surface with a recess provided with metal wipers radially projecting from the recess.

According to a preferred embodiment, a plurality of J-shaped seals are fixed to the composite rings and are adapted to slide on respective annular pads.

According to a preferred embodiment, an axial screw holds each of the J-shaped seals to one of the composite rings and to one of the metallic rings.

According to a preferred embodiment, each of the metallic rings has a radial branch and each of the composite rings has an end, and the axial screw holds the J-shaped seals at the radial branch of the respective one of the metallic rings and at the end of the respective one of the composite rings.

According to a preferred embodiment, a layer made of abradable material is arranged on one of the composite rings.

According to a preferred embodiment, the composite rings each comprise a recess with two axial ends, and wherein the layer made of abradable material is arranged at the axial ends of the recess of the one of the composite rings.

The present application also relates to a rotor for a compressor of a turbomachine, such as an aircraft turbojet engine, comprising: composite rings, each composite ring of substantially axisymmetric shape and made of composite material; metallic rings, each of which supporting a respective annular row of rotor blades, each metallic ring being interposed axially between two of the composite rings and having a cross-section with an axial branch that overlaps axially partially said two of the composite rings; wherein the cross-section is in the shape of the Greek letter π, comprising two radial branches, each of the two composite rings having an end extending radially and arranged in abutment on one of the respective radial branches of the metallic ring.

According to a preferred embodiment, the axial branch has an internal surface for centering the two composite rings.

The present application also relates to a rotor for a compressor of a turbomachine, such as an aircraft turbojet engine, comprising: composite rings, each composite ring of substantially axisymmetric shape and made of composite material; metallic rings, each of which supporting a respective annular row of rotor blades, each metallic ring being interposed axially between two of the composite rings and having a cross-section with an axial branch that overlaps axially partially said two of the composite rings, wherein the composite rings are of a generally U-shape, open radially inwards or outwards.

The present application is also directed to a compressor comprising: a rotor as detailed above; at least one row of stator blades arranged axially between two successive annular rows of rotor blades, the stator blades being supported by an internal ferrule axially overlapping a composite ring, and a seal being disposed between the internal ferrule and the composite ring.

According to a preferred embodiment, the seal is a brush seal provided with sealing bristles, each of the bristles being fixed at one of its ends to the internal ferrule and sliding at its other end on the composite ring.

According to a preferred embodiment, the seal is an annular seal of J-shape, defining a main branch and an auxiliary branch, the main branch of the J being fixed to the composite ring and the auxiliary branch sliding on an annular pad of the internal ferrule. Alternatively, the J-seal can be fixed to the internal ferrule and can slide on the composite ring.

According to a preferred embodiment, the seal is made of metallic wipers on the internal ferrule which interact with layers of abradable material arranged on the composite ring. The composite ring can have a recess and the layers of abradable material are arranged at each axial end of the recess.

The present application also relates to a method of assembling a rotor according to one of the embodiments set out above, the method comprising the stacking of composite rings and metallic rings in alternance.

The present application also relates to a method of assembling a compressor according to one of the embodiments set out above, the method comprising the fitting of a composite ring in axial overlap of an internal stator shroud, then the installation of a metallic ring in contact with the composite ring, followed by the installation of a second composite ring against the metallic ring, and finally the fixing by screw or rivet of the metallic ring to the two composite rings.

The hybrid design of the rotor according to the present application allows substantial weight savings compared to a rotor having a completely metallic drum. Compared to a one-piece rotor, the manufacturing time is reduced, since several elements can be manufactured in parallel before being assembled together. Also, the axial weight distribution is more homogeneous.

In the following description, the terms "internal" (or "interior") and "external" (or "exterior") refer to a positioning relative to the axis of rotation of an axial turbomachine. The axial direction corresponds to the direction along the axis of rotation of the turbomachine. The radial direction is perpendicular to the axis of rotation. Upstream and downstream are in reference to the main flow direction of the flow in the turbomachine. The term "integral" is understood to be integral in rotation, and in particular rigidly linked.

The figures show the elements schematically, in particular without all of the assembly or sealing elements. The dimensions and in particular the radial thickness of the elements is exaggerated in order to facilitate the understanding of the figures.

FIG. 1 shows an axial turbomachine 2, or turbojet engine. The turbojet engine 2 comprises a low-pressure compressor 4 and a high-pressure compressor, a combustion chamber 8 and one or more turbines 10. In operation, the mechanical power from the turbine 10 transmitted to the rotor 12 sets in motion the two compressors 4 and 6. The latter comprise several rows of rotor blades associated with rows of stator blades. The rotation of the rotor around its axis of rotation 14 thus makes it possible to generate an air flow and to compress it progressively towards the inlet of the combustion chamber 8.

A fan 16 is coupled to the rotor 12 and generates an air flow which is divided into a primary flow 18 and a secondary flow 20 passing through an annular duct (partially shown) along the engine and then joining the primary flow at the outlet. turbine.

Reduction means, such as a planetary reduction gear 22, can reduce the speed of rotation of the fan and/or of the low-pressure compressor relative to the associated turbine. The secondary flow can be accelerated so as to generate a thrust reaction necessary for the flight of an aircraft.

Figure 2:
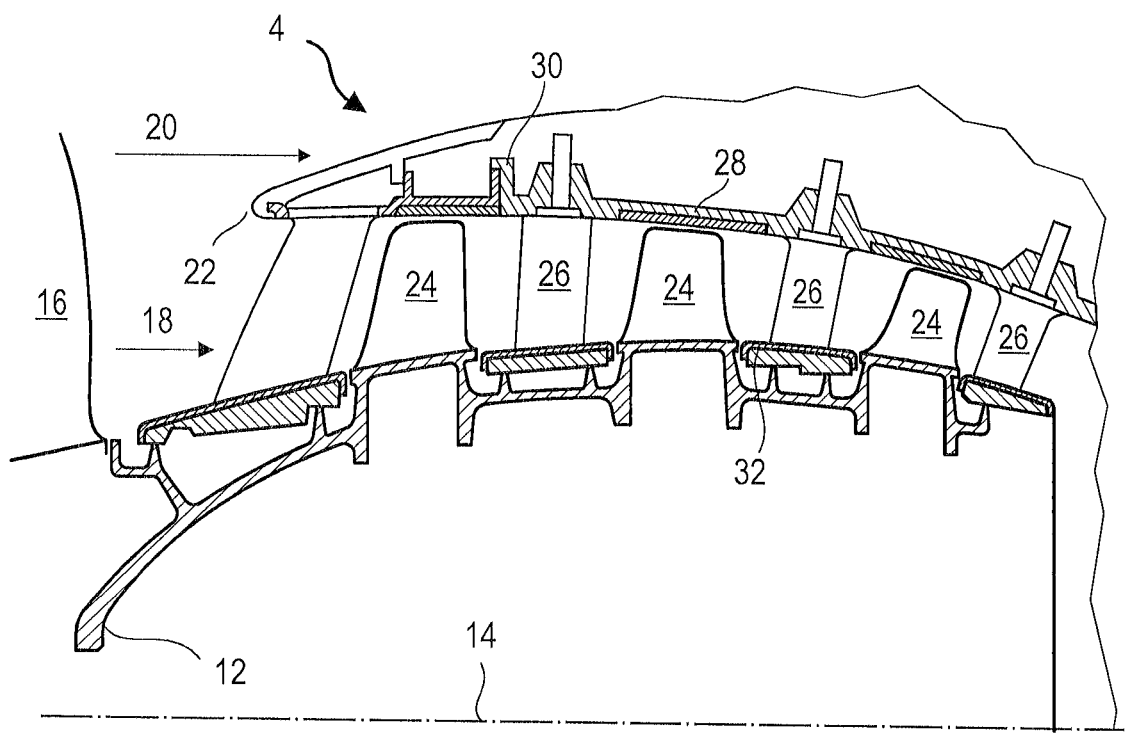
FIG. 2 shows a schematic sectional view of part of a compressor known in prior art.

FIG. 2 is a sectional view of a compressor of a known axial turbomachine. The compressor can be a low-pressure compressor 4. One can observe part of the fan 16 as well as the separation nozzle 22 of the primary 18 and secondary flow 20. The rotor 12 can comprise several rows of rotor blades 24.

The low-pressure compressor 4 comprises at least one rectifier which contains an annular row of stator blades 26. Each rectifier is associated with the fan 16 or with a row of rotor blades 24 to rectify the air flow (redress the velocity of the flow).

The low-pressure compressor 4 comprises at least one casing 28. The casing 28 may have a generally circular or tubular shape. It can be an external compressor casing and can be made of composite material. The casing 28 may include fixing flanges 30, for example annular fixing flanges 30. The annular flanges 30 can be made of composite material and can include fixing holes (not shown) to allow fixing by bolts.

Thanks to the composite material, the casing 28 can measure between 3 and 5 mm thick for a diameter greater than 1 meter.

The stator blades 26 extend essentially radially from the casing 28 to internal ferrules 32.

In this example of a known rotor, the rotor 12 is in one piece with three annular rows of rotor blades 24 extending radially from the rotor 12 towards the vicinity of the casing 28.

Figure 3:
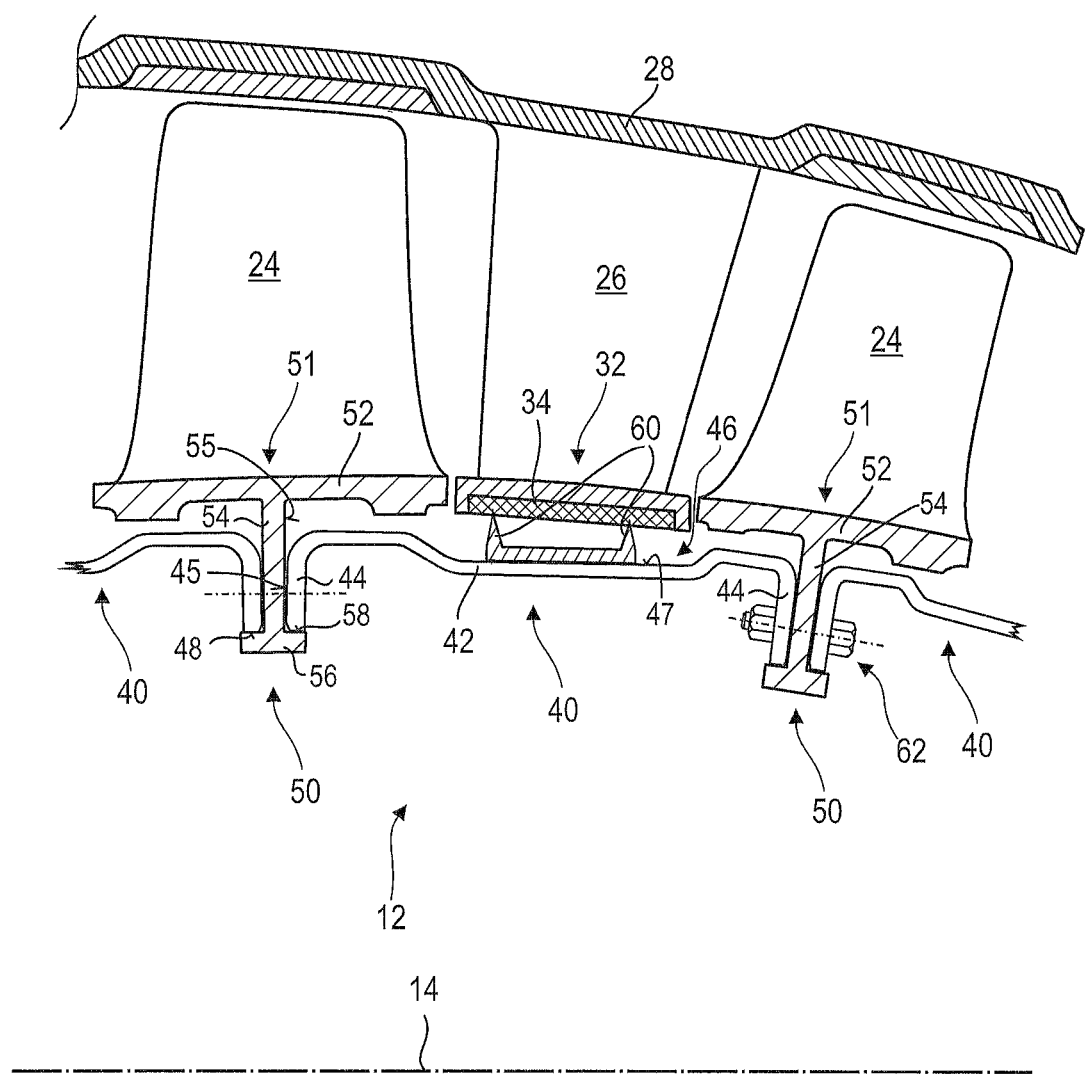
FIG. 3 shows a sectional view of the rotor according to a first embodiment of the present application.

FIG. 3 illustrates part of a rotor 12 according to the present application. The rotor 12 comprises several rings 40 made of composite material. The composite material can be of the carbon-fiber type with an elastomeric matrix or an organic matrix. Each composite ring 40 is annular and has a substantially tubular central portion 42 and two ends 44 extending radially. In the example of FIG. 3, the ends 44 extend radially inwards, forming with the central portion 42 a U-shaped profile open inwards.

The rotor 12 also includes metallic rings 50 interposed between the composite rings 40. The metallic rings 50 are annular. The metallic rings 50 have a cross-section 51, having at least one branch extending axially 52 and at least one branch extending radially 54. The section can be T or π (see the example in FIG. 9). The axial branch 52 at least partially overhangs or overlaps the composite rings 40. By overlapping, it is meant that there is a portion of the composite ring 40 and a portion of each of the metallic rings 50 which share the same axial position. The radial branch 54 is in contact with the ends 44 of the composite rings. Thus, a surface 55 of the radial branch 54 abuts the composite rings 40 by contacting a surface 45 of the composite ring 40. The contact between the surface 55 and the surface 45 is axial.

The radial branch 54 ends radially internally with a thickened portion 56. This thickened portion 56 has surfaces 58 which allow the centering of the composite rings 40 through their contact with radially internal surfaces 48 of the ends 44.

The composite rings 40 can be shaped with a recess 46 arranged on their outer surface 47. This can be in the form of an annular groove. In this recess 46 are arranged metal wipers 60 which can serve as a seal. The wipers 60 project from a metal ring fixed to the composite ring 40. These wipers 60 cooperate with a layer of abradable material 34 fitted internally to the internal ferrule 32 which supports the stator blades 26.

The axial branch 52 supports the rotor blades 24. The rotor blades 24 can be welded to the axial branch 52. Alternatively, the rotor blades 24 are integral with the metallic ring 50. Such a design can be obtained, at least partially, by foundry and then machining.

An annular row of fastening elements such as axial screws 62 can be provided for assembling a metallic ring 50 to two composite rings 40.

Figure 4:
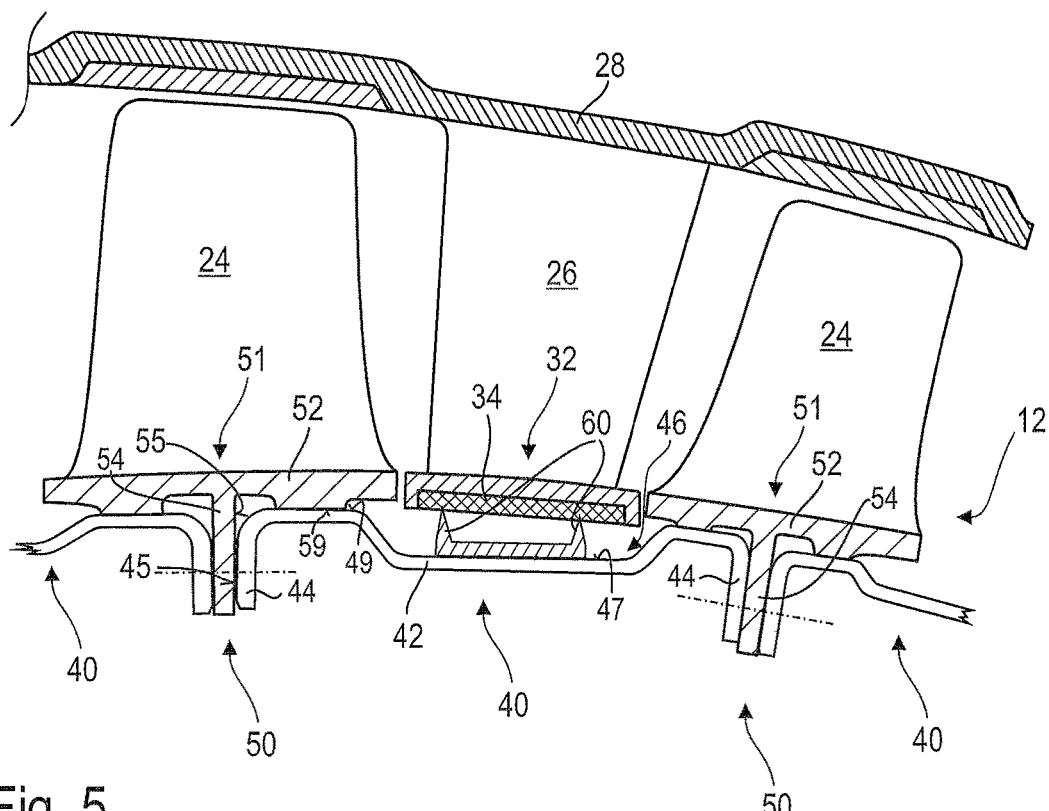
FIG. 4 shows a sectional view of the rotor according to a second embodiment of the present application.

FIG. 4 describes an alternative embodiment of the rotor 12 of FIG. 3. In this example, the centering of the composite rings 40 on the metallic ring 50 (or of the metallic ring 50 on the composite rings 40) is produced by a surface 49 external to the composite ring 40 in contact with an interior surface 59 of the axial branch 52 of the metallic ring 50.

Figure 5:
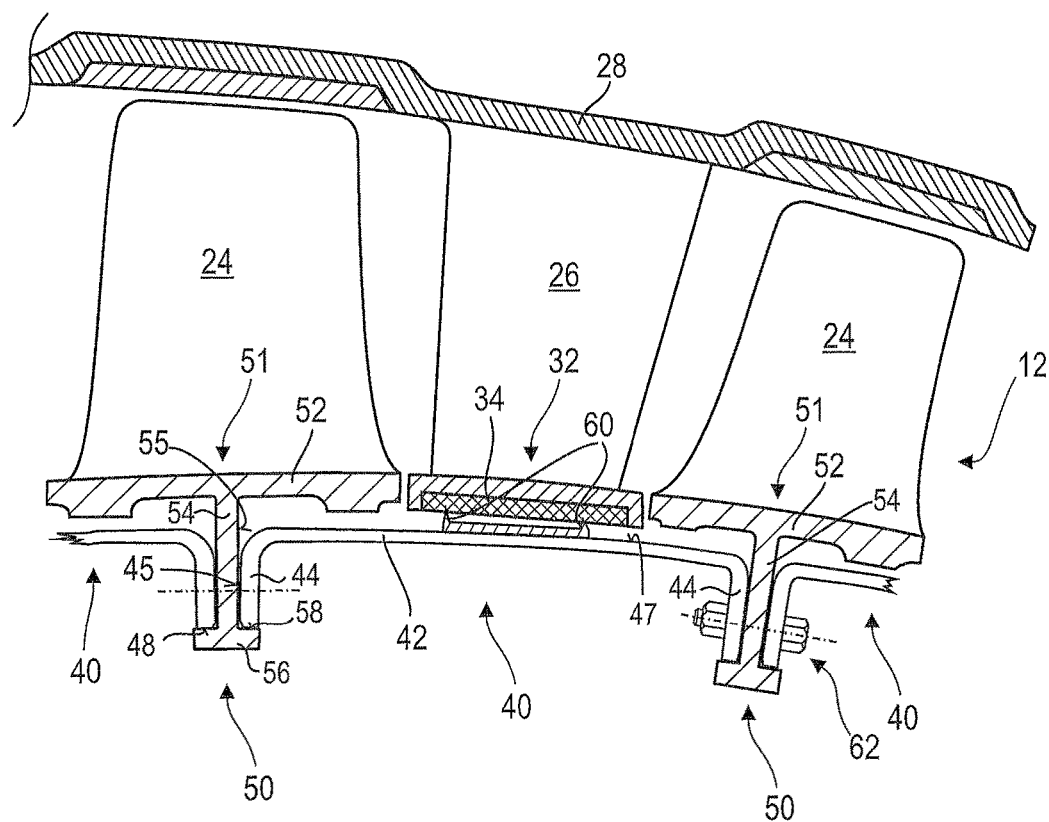
FIG. 5 illustrates a sectional view of the rotor according to a third embodiment of the present application.

FIG. 5 describes an alternative embodiment of the rotor 12 of FIG. 3. In this example, the central portion 42 of the composite rings 40 is devoid of recess and therefore has a regular surface such as a cone, a cylinder, or an arc of ellipsoid.

Figure 6:
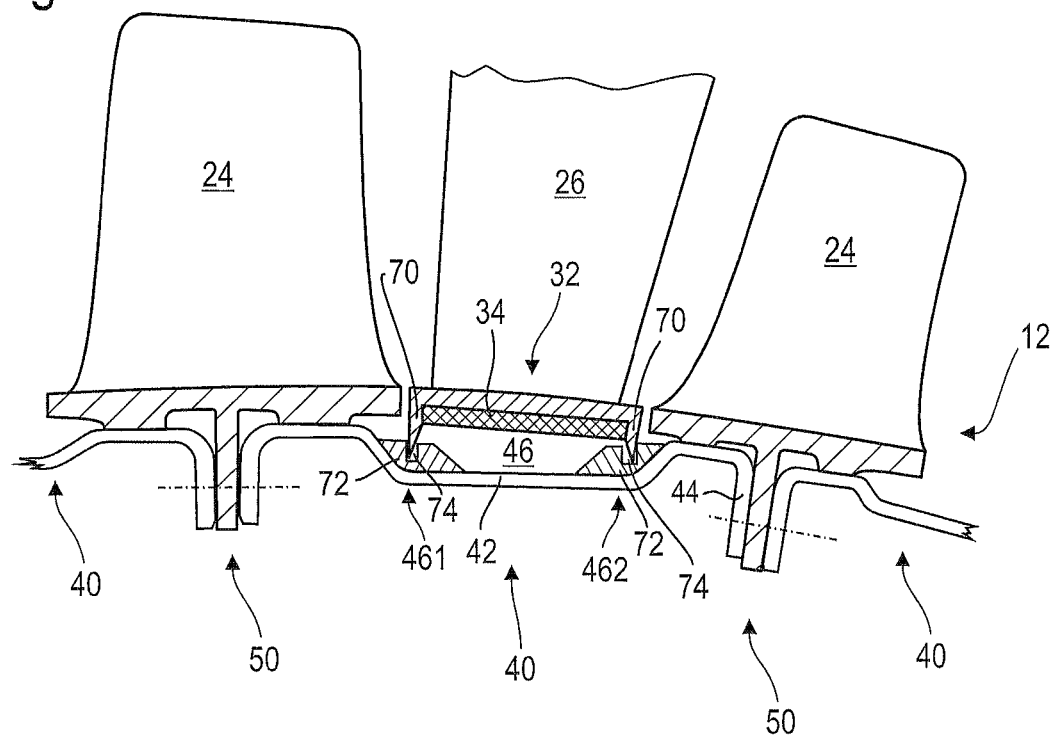
FIG. 6 shows a sectional view of the rotor according to a fourth embodiment of the present application.

FIG. 6 describes an alternative embodiment of the rotor 12 of FIG. 3. In contrast to FIG. 3, the metal wipers 70 are here carried by the internal ferrule 32 and rings 72 of abradable material are provided with annular grooves 74 which cooperate with the metal wipers 70. The recess 46 has two axial ends 461, 462 and the rings 72 are preferably arranged at these axial ends 461, 462.

Figure 7:
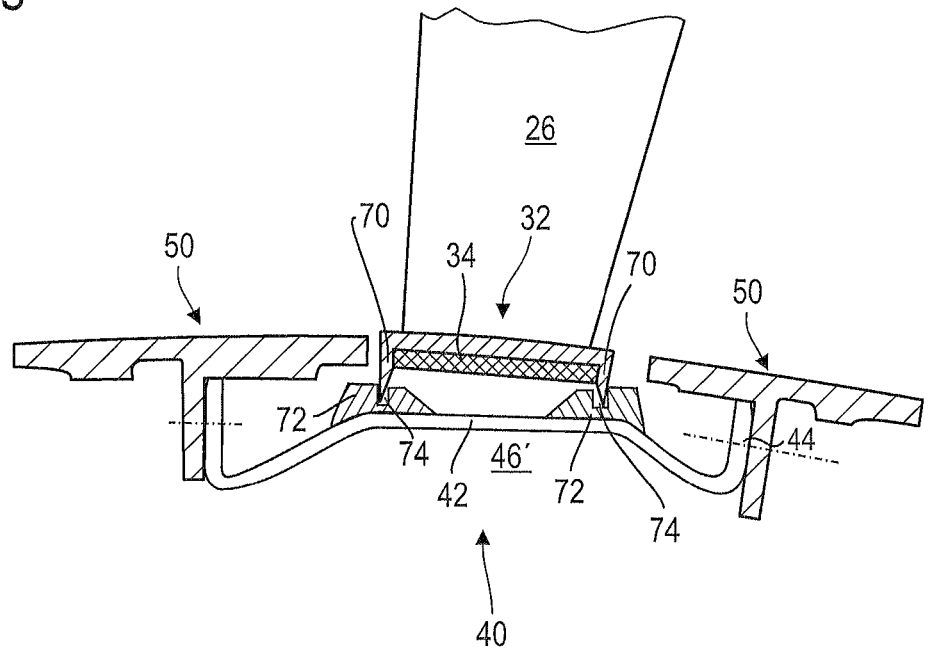
FIG. 7 illustrates a sectional view of the rotor according to a fifth embodiment of the present application.

FIG. 7 describes another example of design for the rotor 12. In this example, the cross-section outline of the composite rings 40 is in a U open towards the outside. Metal wipers 70 cooperate with rings 72 which can be arranged on a bump 46 of the composite ring 40.

Figure 8:
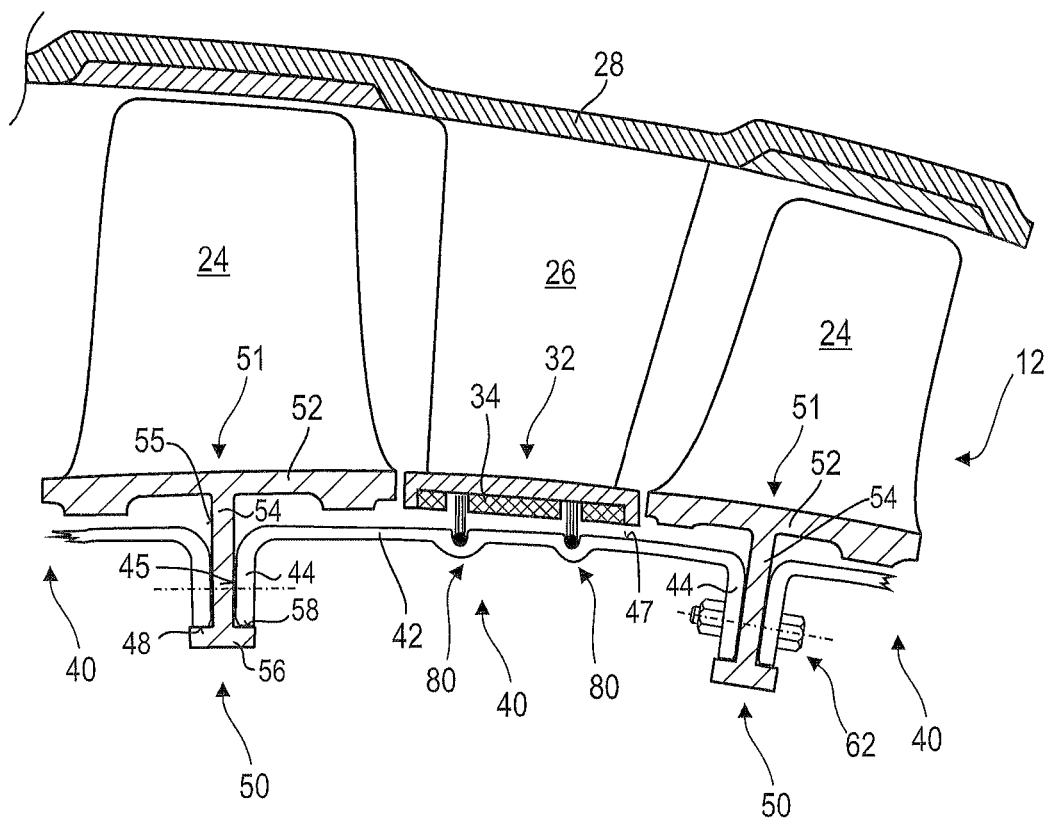
FIG. 8 shows a sectional view of the rotor according to a sixth embodiment of the present application.

FIG. 8 shows a rotor 12 similar to the previous figures with only a different seal. In this example, the seal is a brush seal 80. A multitude of bristles extends radially for each of the seals 80. The bristles have one end attached to the composite ring 40 and another end which slides over the layer of abradable material 34. Alternatively, the bristles can be attached to the internal ferrule 32 at one of their ends and can slide over an abradable layer arranged on the composite ring 40.

Figure 9:
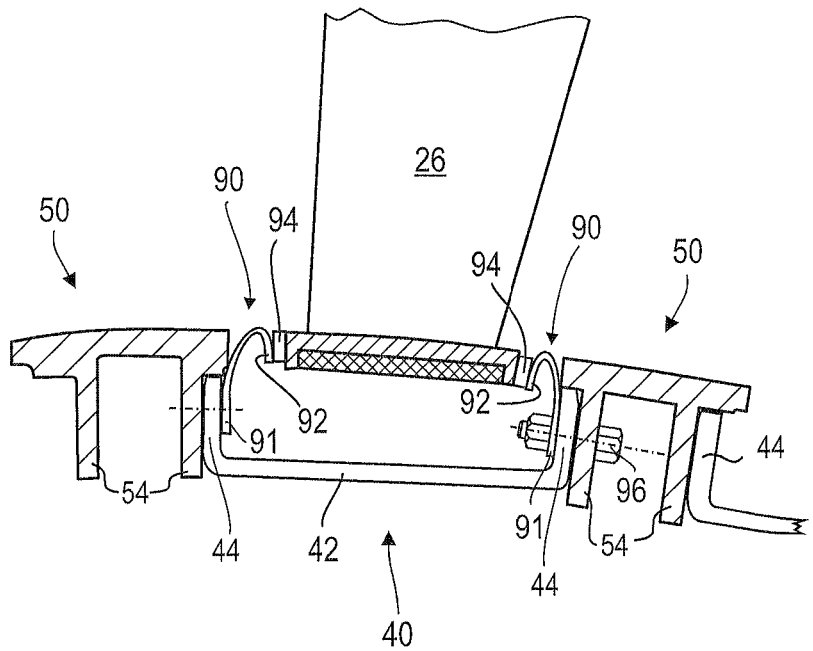
FIG. 9 shows a sectional view of the rotor according to a seventh embodiment of the present application.

FIG. 9 shows a further embodiment. This example illustrates another variant for the seal between the ferrule and the composite rings. This example also illustrates a different cross-section for the metallic ring. Thus, FIG. 9 illustrates a metallic ring with a cross-section in the shape of a Greek letter π. In cross-section, the metallic ring has an axial branch 52 and two radial branches 54. Each of the radial branches of a metallic ring contacts a radial end 44 of a composite ring 40.

A seal 90 of J-section is provided between the composite ring 40 (in particular between its radial ends 44) and the stator shell 32. The seal 90 comprises a main branch 91 fixed to the composite ring 40 and an auxiliary branch 92 sliding on an annular pad 94 attached to the ferrule. Screws 96 can be provided to fix the main branch 91 to the composite ring 40.

The different figures show several possible embodiments for the composite rings, for the metallic rings and for the seals. Those skilled in the art will note that these three elements (composite ring, metallic ring, seal) are interchangeable from one figure to another: in particular, each type of seal can be used with each type of composite ring and metallic ring.

I claim:

1. A rotor for a compressor of a turbomachine, the rotor comprising:
    composite rings, each composite ring of substantially axisymmetric shape and made of composite material; and
    metallic rings, each of which supporting a respective annular row of rotor blades, each metallic ring being interposed axially between two of the composite rings and having a cross-section with an axial branch that overlaps axially partially said two of the composite rings;
    wherein the metallic rings are connected in pairs and exclusively by means of one of the composite rings.

2. The rotor according to claim 1, wherein the cross-section is T-shaped and comprises:
    a radial branch, each of said two composite rings having an end extending radially and arranged in abutment on the radial branch of the metallic ring.

3. The rotor according to claim 2, wherein a screw or a rivet passes through the radial branch of the metallic ring and through the respective ends of each of the two composite rings.

4. The rotor according to claim 2, wherein the radial branch has an internal radial end which comprises:
    an axial thickened portion projecting upstream and downstream of the radial branch, the thickened portion defining two radially external surfaces for centering the respective end of the two composite rings on the metallic ring.

5. The rotor according to claim 1, wherein a layer made of abradable material is arranged on one of the composite rings.

6. A rotor for a compressor of a turbomachine, the rotor comprising:
   composite rings, each composite ring of substantially axisymmetric shape and made of composite material; and
   metallic rings, each of which supporting a respective annular row of rotor blades, each metallic ring being interposed axially between two of the composite rings and having a cross-section with an axial branch that overlaps axially partially said two of the composite rings;
   wherein the metallic rings are connected in pairs and exclusively by means of one of the composite rings;
wherein the composite rings have an external surface with a recess provided with metal wipers radially projecting from the recess.

* * * * *